US006658526B2

(12) United States Patent
Nguyen et al.

(10) Patent No.: US 6,658,526 B2
(45) Date of Patent: **\*Dec. 2, 2003**

(54) NETWORK ATTACHED VIRTUAL DATA STORAGE SUBSYSTEM

(75) Inventors: Thai Nguyen, Thornton, CO (US); Robert M. Raymond, Boulder, CO (US); Michael L. Leonhardt, Longmont, CO (US)

(73) Assignee: Storage Technology Corporation, Louisville, CO (US)

( \* ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/421,916

(22) Filed: Oct. 20, 1999

(65) Prior Publication Data

US 2002/0004883 A1 Jan. 10, 2002

Related U.S. Application Data

(63) Continuation-in-part of application No. 09/343,512, filed on Jun. 30, 1999, which is a continuation of application No. 08/815,739, filed on Mar. 12, 1997, now abandoned.

(51) Int. Cl.[7] .............................................. G06F 12/00
(52) U.S. Cl. ........................................ 711/111; 711/203
(58) Field of Search .............................. 711/4, 111, 112, 711/114, 170, 203, 209; 369/30, 34; 709/104

(56) References Cited

U.S. PATENT DOCUMENTS

| | | |
|---|---|---|
| 3,130,387 A | 4/1964 | Wright et al. |
| 3,699,533 A | 10/1972 | Hunter |
| 3,806,888 A | 4/1974 | Brickman et al. |
| 3,909,799 A | 9/1975 | Recks et al. |
| 3,949,377 A | 4/1976 | O'Neill, Jr. |
| 3,976,977 A | 8/1976 | Porter et al. |
| 4,021,782 A | 5/1977 | Hoerning |
| 4,040,026 A | 8/1977 | Gernelle |

(List continued on next page.)

FOREIGN PATENT DOCUMENTS

CA        892798        2/1972

(List continued on next page.)

OTHER PUBLICATIONS

Sam Coleman, Steve Miller. Mass Storage System Reference Model: Version 4. Developed by the IEEE Technical Committee on Mass Storage Systems and Technology. 38 pages.

(List continued on next page.)

*Primary Examiner*—Matthew Kim
*Assistant Examiner*—Pierre-Michel Bataille
(74) *Attorney, Agent, or Firm*—Wayne P. Bailey

(57) ABSTRACT

This data storage subsystem creates multiple virtual storage devices on demand, which are available to any and all of the system's host data processors. The subsystem utilizes a plurality of tape devices and automated tape libraries with the tape devices connected to a plurality of data processors via a high-speed network. A set of software components, the Network Storage Manager (NSM) controls all system operations. Depending upon the requested storage performance, one or more tape devices are assigned to a virtual device. Data stripping across multiple tape devices allows the storage bandwidth of a virtual device to be changed on demand. The overall capacity and performance of the subsystem is scalable by adding or removing storage devices. The NSM system controller contains a plurality of software elements including: Resource Allocation, Resource Configuration, Resource Management, and Security Management modules. The use of a networked storage manager enables the storage devices to be managed as a pool and yet be attached directly to the network as individual resources. The NSM also provides the mechanism for the enterprise management to control tape device allocation and configuration as well as other functions, such as tape cartridge movement, data migration and data security.

20 Claims, 6 Drawing Sheets

U.S. PATENT DOCUMENTS

| | | | |
|---|---|---|---|
| 4,054,951 A | 10/1977 | Jackson et al. | |
| 4,080,651 A | 3/1978 | Cronshaw et al. | |
| 4,080,652 A | 3/1978 | Cronshaw et al. | |
| 4,084,234 A | 4/1978 | Calle et al. | |
| 4,086,629 A | 4/1978 | Desyllas et al. | |
| 4,110,823 A | 8/1978 | Cronshaw et al. | |
| 4,123,795 A | 10/1978 | Dean, Jr. et al. | |
| 4,126,893 A | 11/1978 | Cronshaw et al. | |
| 4,126,894 A | 11/1978 | Cronshaw et al. | |
| 4,158,235 A | 6/1979 | Call et al. | |
| 4,215,400 A | 7/1980 | Denko | |
| 4,228,501 A | 10/1980 | Frissell | |
| 4,241,420 A | 12/1980 | Fish et al. | |
| 4,246,637 A | 1/1981 | Brown et al. | |
| 4,276,595 A | 6/1981 | Brereton et al. | |
| 4,298,932 A | 11/1981 | Sams | |
| 4,310,883 A | 1/1982 | Clifton et al. | |
| 4,318,184 A | 3/1982 | Millett et al. | |
| 4,327,408 A | 4/1982 | Frissell et al. | |
| 4,412,285 A | 10/1983 | Neches et al. | |
| 4,414,644 A | 11/1983 | Tayler | |
| 4,533,995 A | 8/1985 | Christian et al. | |
| 4,945,429 A | 7/1990 | Munro et al. | |
| 5,129,088 A * | 7/1992 | Auslander et al. | 711/1 |
| 5,164,909 A * | 11/1992 | Leonhardt et al. | 364/478.03 |
| 5,214,768 A | 5/1993 | Martin et al. | |
| 5,303,214 A | 4/1994 | Kulakowski et al. | |
| 5,386,516 A * | 1/1995 | Monahan et al. | 369/30 |
| 5,388,260 A | 2/1995 | Monahan et al. | |
| 5,412,791 A | 5/1995 | Martin et al. | |
| 5,454,103 A * | 9/1995 | Coverston et al. | 711/170 |
| 5,455,926 A * | 10/1995 | Keele et al. | 711/4 |
| 5,504,873 A | 4/1996 | Martin et al. | |
| 5,506,986 A | 4/1996 | Healy | |
| 5,537,585 A | 7/1996 | Blickenstaff et al. | |
| 5,546,557 A * | 8/1996 | Allen et al. | 711/111 |
| 5,566,331 A | 10/1996 | Irwin, Jr. et al. | |
| 5,568,629 A * | 10/1996 | Gentry et al. | 711/114 |
| 5,613,154 A | 3/1997 | Burke et al. | |
| 5,630,067 A | 5/1997 | Kindell et al. | |
| 5,649,152 A * | 7/1997 | Ohran et al. | 711/114 |
| 5,689,481 A | 11/1997 | Tamura et al. | |
| 5,790,852 A * | 8/1998 | Salm | 709/104 |
| 5,805,864 A * | 9/1998 | Carlson et al. | 395/500.45 |
| 5,878,232 A * | 3/1999 | Marimuthu | 709/224 |
| 5,881,311 A * | 3/1999 | Woods | 710/4 |
| 5,954,796 A * | 9/1999 | McCarty et al. | 370/241 |
| 5,996,024 A * | 11/1999 | Blumenau | 709/301 |
| 6,041,363 A * | 3/2000 | Schaffer | 709/301 |
| 6,044,442 A * | 3/2000 | Jesionowski | 711/100 |
| 6,141,729 A * | 10/2000 | Ishida et al. | 711/114 |
| 6,154,854 A * | 11/2000 | Stallmo | 711/114 |
| 6,216,202 B1 * | 4/2001 | D'Errico | 711/112 |

FOREIGN PATENT DOCUMENTS

| | | |
|---|---|---|
| CA | 907211 | 8/1972 |
| GB | 1167762 | 10/1969 |
| GB | 1353770 | 5/1974 |
| GB | 1359662 | 7/1974 |
| GB | 1496779 | 1/1978 |
| GB | 1496780 | 1/1978 |
| GB | 1547381 | 6/1979 |
| GB | 2063532 B | 6/1981 |
| JP | 51-18409 | 2/1976 |
| JP | 52-106641 | 9/1977 |
| JP | 53-22331 | 3/1978 |
| JP | 53-84632 | 7/1978 |
| JP | 53-98741 | 8/1978 |
| JP | 53-108747 | 9/1978 |
| JP | 55-153058 | 11/1980 |
| JP | 55-164958 | 12/1980 |
| JP | 4-48250 | 8/1992 |

OTHER PUBLICATIONS

J.L. Sloan, B.T. O'Lear, D.L. Kitts, and B.L. Irwin. MaSSIVE™: The Mass Storage System IV Enterprise. Proceedings of the IEEE, vol. 81, No. 4,. pp. 621–630.

Garth Gibson. Network–Attached Secure Disks (NASD). ARPA ITO Scalable Systems and Software. pp. 1–24.

David Nagle, Garth Gibson, Greg Ganger & Bill Courtright. Networking for Network–Attached Storage. NADS/NSIC Networking Workshop. pp. 1–18.

Shared Virtual Storage System, System Description, 1979, pp. 1–14, Nasstor Systems Corporation, Sunnyvale, California.

Shared Virtual Storage System, System Overview, 1980, pp. 1–60, Masstor Systems Corporation, Sunnyvale, California.

Digest Of Papers, The Gap Between MSS Products and User Requirements, Fourth IEEE Symposium on Mass Storage Systems, Apr. 15–17, 1980, pp. 1–76, Nat'l Center for Atmospheric Research, Boulder, Colorado.

FPEXEC, File Processor Executive Program Logic Manual, Oct. 18, 1982, pp. 1–177, Masstor Systems Corp., Sunnyvale, California.

Waddell, J.M. and Way, D.L., Channel Scheduling By A Control Unit, IBM Technical Disclosure Bulletin, vol. 17, No. 9, Feb. 1975.

Liptay, J.S., Structural Aspects of the System/360 Model 85, IBM Systems Journal, pp. 1–14, vol. 7, No. 1, 1968.

Meade, Robert M., How a cache memory enhances a computers's performance, Electronics, Jan. 17, 1972, pp. 58–63.

Smith, Alan Jay, Directions For Memory Hierarchies And Their Components: Research And Development, 1978.

Christman, R.D., Collins, M.W., Devaney, M.A., Willbanks, E.W., A Network File Storage System, UC–32, 7–81, pp. 1–14.

Reference Manual for IBM 3830 Storage Control Model 1 and IBM 3330 Disk Storage, GA26–1592–5, File No. S360/S370–07, pp. 1–101.

Porter, James N., The Disk Drive Industry, IEEE Transactions On Magnetics, vol. MAG–14, No. 4, Jul. 1978.

Puthoff, S.H., Technical Innovations In Information Storage And Retrieval, IEEE Transactions On Magnetics, vol. MAG–14, No. 4, Jul. 1978, pp. 143–148.

Boggs, JR., Virtual Input/Output Channels For A Digital Computer, IBM Tech. Disc. Bull., vol. 20, No. 1, Jun. 1977, pp. 110–112.

Nishimukai, T., Tsujioka, S., Kadono, S., Chiba, T., Universal 10 Device Controller By Using Programmable Logic Arrays, IEEE 1978, pp. 477–480.

Christman, R.D., Collins, M.W., Devaney, M.A., Willbanks, E.W., A Network File–Storage System, Los Alamos Scientific Laboratory, LA–8887–MS, pp. 1–14.

Chorn, G.E., Christman, R.D., Klingner, C.T., The Standard File Transport Protocol, LA–7388–MS Informal Report UC–32 Issued: Aug. 1978.

Mitchell, Jr., M.J., Diskette Load/Dump Control, IBM Tech. Disc. Bull. vol. 20, No. 4, 9–1977, pp. 1359–1361.

Collins, M.W., Mass Storage at LASL, Los Alamos Scientific Laboratory, pp. 95–112.

The TBM Mass Memory System, Ampex Corporation, Sunnyvale, CA, pp. 1–30.

Crittendon, Jr., W.C., Operational Characteristics Of The NCAR Mass Storage Device, pp. 48–50.

Howie, Jr., H. Robert, More Practical Applications of Trillion–Bit Mass Storage Systems, Advanced Systems Dept./Ampex Corp., Sunnyvale, CA.

Shell Oil Company Purchase Order, Purchase Order No. SH–84378–JLH, Dec. 12, 1978 w/Agreement Between Masstor Systems Corporation and Shell Oil Co. as an attachment.

Masstor, MC Series Computer, Specifications.

Blood, P.M., Christman, R.D., Collins, M.W., Willbanks, E.W., Common File System Specifications, LA–7065–MS Informal Report, Sep. 1977, pp. 1–15.

IBM 3850 Mass Storage System (MSS) Introduction and Preinstallation Planning, GA32–0038–1, File No. S370–07.

IBM System/370 Principles of Operation, GA22–7000–8, File No. S370–01.

IBM 3850 Mass Storage System (MSS) Principles of Operation: Theory, GA32–0035–1, File No. S370–07.

* cited by examiner

US 6,658,526 B2

NETWORK ATTACHED VIRTUAL DATA STORAGE SUBSYSTEM

This is a continuation-in-part application of prior application Ser. No. 09/343,512 filed on Jun. 30, 1999, which is a continuation of prior application Ser. No. 08/815,739 filed on Mar. 12, 1997 now ABN.

FIELD OF THE INVENTION

This invention relates to data storage systems and, in particular, to a plurality of tape devices and automated tape libraries where the tape devices are connected to a plurality of data processors via a high speed network and which along with a Network Storage Manager system controller collectively implement a virtual, distributed data storage subsystem. This readily scalable data storage subsystem creates multiple virtual storage devices on demand, which are available to any and all of the system's data processors.

Problem

It is a problem in the field of data storage subsystems to provide their attached data processors with economical data storage services at adequate performance levels. Although storage device technology can support the development and implementation of specialized devices with uniquely high performance levels, such devices are generally not economically feasible. Commercial, off-the-shelf storage devices are typically the most economical building blocks for data storage subsystems but these devices can impose performance limitations; applications requiring performance levels beyond the storage device's native characteristics require the use of architectural approaches.

One other aspect of this data storage problem is that the allocation of customer data to a single type of data storage device represents a limitation when faced with widely varying data storage needs. This limitation can be partly obviated by sharing input/output (I/O) activity and data bandwidth across a plurality of data storage devices of a data storage subsystem. However, a fixed configuration of data storage devices also limits the scalability in performance and provides no facility for applications to request changes in data storage performance. An architecture where the data storage devices are located behind a server(s) further limits the delivered performance since the data storage bandwidth is limited by the server itself. Therefore, architecting a data storage subsystem that can efficiently serve the needs of the applications extant on the data processors is a daunting problem. There are numerous factors that affect performance; this problem is particularly pertinent to tape devices, since the tape devices must serve a wide range of performance requirements and it would be desirable for a single tape device type to serve this wide range of needs.

In FIG. 1, a traditional "direct attach" tape configuration is shown. Here tape devices TD1, TD2, TD3 are each directly connected to single data processors DP1, DP2, DP3 on a control network CN in a dedicated tape device configuration. The data processor has exclusive use of the tape device and typically communicates with the tape device via a SCSI or Fibre Channel interface. However, the use of dedicated tape devices is an expensive proposition where there are a plurality of data processors to be served, especially if the data access loads generated by the plurality of data processors are erratic. In this data storage subsystem architecture, the utilization of the tape devices and the efficiency of the data storage function are less than optimal, since each data processor is limited to its dedicated tape device with its physical constraints.

FIG. 1 also includes an automated tape cartridge library system (ACS) and an automated cartridge controller (ACSC) which provides enhanced response time for the tape devices by mounting/dismounting their tape cartridges. However, the tape devices may have a SCSI interface in the data path that introduces a number of physical limitations to the operation of the system. The first limitation is that only a small number of tape devices can be attached to a SCSI bus compared to other bus architectures. The second limitation is the limited bandwidth of the SCSI bus that is shared by these tape devices. The length of the SCSI cable also represents a limitation, since it is typically restricted to 25 meters.

An alternative data storage subsystem architecture is shown in FIG. 2. Here, a traditional "client/server" network attached tape configuration includes a plurality of tape devices TD1, TD2, TD3 each attached to the data communication network N via dedicated servers TS1, TS2, TS3; data processors DP1, DP2, DP3 connect to the network directly. In this architecture, the data processors all have access to all of the tape devices via their servers. The data processors run tape server software to manage the access protocol for the plurality of tape servers. Though this configuration allows tape devices to be allocated dynamically, it does not scale very well with the demand on the data transfer rate because the bandwidth is limited by the server.

A variation of this storage architecture is the use of a plurality of tape devices configured into an array. As shown in FIG. 3, the tape devices are configured in a Redundant Array of Independent Tapes (RAIT) in a manner analogous to the Redundant Array of Independent Disks (RAID) which is a well known architecture in the disk device technology. Using a RAIT controller (RC), the tape array is typically located behind a server(s) RS1, RS2, which is directly connected to the network N The bandwidth for data transfers between the data processors and the tape array is not scalable and is also limited by the characteristics of the server(s). The tape array itself is also not scalable or easily reconfigured due to the limitations of the server(s).

These various tape data storage subsystem architectures are all limited in their data exchange I/O activity and bandwidth to that of a single tape device or a fixed RAIT device. The alternative is to use the integration of a plurality of data storage media types (e.g. solid state memory, disk, tape, etc.) and data storage subsystem architectures into a single data storage subsystem. However, this results in increased storage system complexity and costs.

Solution

The above-described problems are solved and a technical advance achieved in the field by the network attached virtual tape data storage subsystem of the present invention. This invention relates to tape data storage systems and, in particular, to a plurality of tape devices and automated tape libraries where the tape devices are connected to a plurality of data processors via a high bandwidth network and which, along with a Network Storage Manager (NSM) controller, collectively implement a virtual, distributed tape data storage subsystem. The virtual, distributed tape data storage system creates multiple virtual tape devices on demand by allocating, configuring and managing the system's individual physical tape devices. The I/O rate and bandwidth of the individual virtual tape devices are changeable on demand; the aggregate performance of the virtual, distributed tape data storage subsystem is readily scalable by changing the number of physical tape devices and library devices. By pooling the tape devices together, interconnecting them with the data processors via a network, incorporating the Network Storage Manager controller and creating virtual tape devices, the problems of prior art tape device data storage subsystem architectures are overcome. This new architecture can create simultaneous, multiple virtual devices, which are available to any and all of the data processors—subject only to the limitations of the aggregate capacities and bandwidth of the tape devices, library devices and the network. This architecture enables the storage requirements of the data processors to be met by both individual tape devices or multiple devices in any tape array configurations—including, but not limited to: RAIT 0, 1, 3, 4, 5. The tape array and data transmission bandwidth can be dynamically reconfigured on demand since the network directly interconnects the tape devices to the data processors.

The virtual tape storage subsystem is controlled by a Network Storage Manager (NSM) which includes a plurality of software elements including: Resource Allocation (RA) software, Resource Configuration (RC) software, Resource Management (RM) software, and Security Management software (SM). The NSM communicates with the Automatic Cartridge System Library Software (ACSLS) via the RA software. The ACSLS communicates with the ACS via network CN. The RA software has the responsibility to keep track of the resource usage such as which data processor presently owns which tape device(s), which tape devices are free to be allocated to the requesting data processors and the like. The RC software configures the data storage resources for the network attached data processors—responding to manual operator commands, pre-programmed algorithms, rules, application program initiated requests and the like. The RC software assigns the maximum number of tape devices that a data processor can use and designates the configuration of these tape devices. Furthermore, it automatically configures the tape devices allocated to a data processor as well as the connection between the data processor and the tape device(s). The RM software queues the request for the resource allocation and notifies the data processor when the requested resource is ready, or it can schedule the availability of the resources. The ACSLS has the responsibility to keep track of the tape cartridges that are stored in the ACS. It also keeps track of the status of the tape devices, and provides the application programming interface (API) to other application software. The API will allow the application software to load tape or to mount a volume to a tape drive, to unload tape or to unload a volume from a tape drive, to read the status of tape devices, etc.

The use of a networked storage manager enables the dual function of permitting tape devices to be managed as a pool and yet be attached directly to the network as individual resources. In addition, the networked storage manager provides the mechanism for the central control and management of the resources attached to the network such as to control tape device allocation and configuration, as well as other functions, such as tape cartridge movement and data migration. The rules, which could be implemented, address response time constraints, data file transfer size, data file transfer rates, data file size bounds and the like.

DETAILED DESCRIPTION

Existing Tape Data Storage System Architectures

Figure 1:
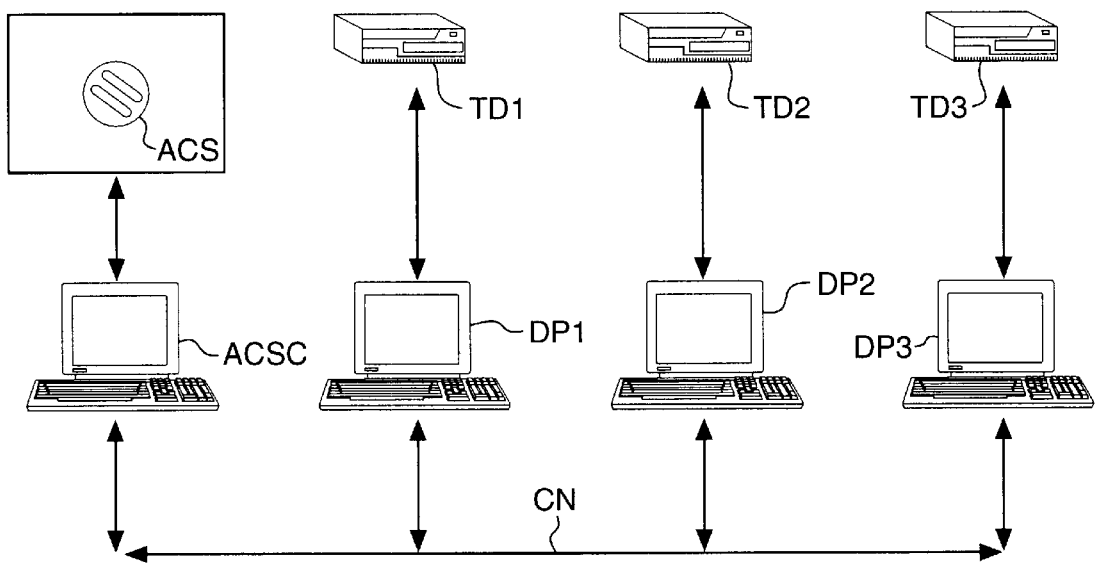
FIG. 1 illustrates in block diagram form the overall architecture of a traditional direct attached tape configuration.

FIG. 1 illustrates in block diagram form the overall architecture of a traditional direct attached tape device configuration, wherein a plurality of data processors DP1–DP3 are each directly connected to at least one tape device TD1–TD3, which tape devices TD1–TD3 for the plurality of data processors DP1–DP3 are served by an automated tape cartridge library system ACS and its associated automated tape cartridge library system controller ACSC. in practice, the ACS consists of one or more robotic library units. The data processors DP1–DP3 communicate with the automated tape cartridge library system controller ACSC via network CN. The automated tape cartridge library system controller ACSC receives data file access requests from the data processors DP1–DP3 and allocates a designated tape cartridge located in the automated tape cartridge library system ACS to serve the request. The automated tape cartridge library system controller ACSC transmits commands to the automated tape cartridge library system ACS to retrieve the selected tape cartridge from its cartridge storage location in the automated tape cartridge library system ACS and mount the retrieved tape cartridge on the tape device TD1–TD3 directly connected to the requesting data processor DP1–DP3. The automated tape cartridge library system controller ACSC transmits commands to the requesting data processors DP1–DP3 when the selected tape cartridge is mounted in the identified tape device TD1–TD3 to indicate that the requested data is presently available on the identified tape device TD1–TD3.

Figure 2:
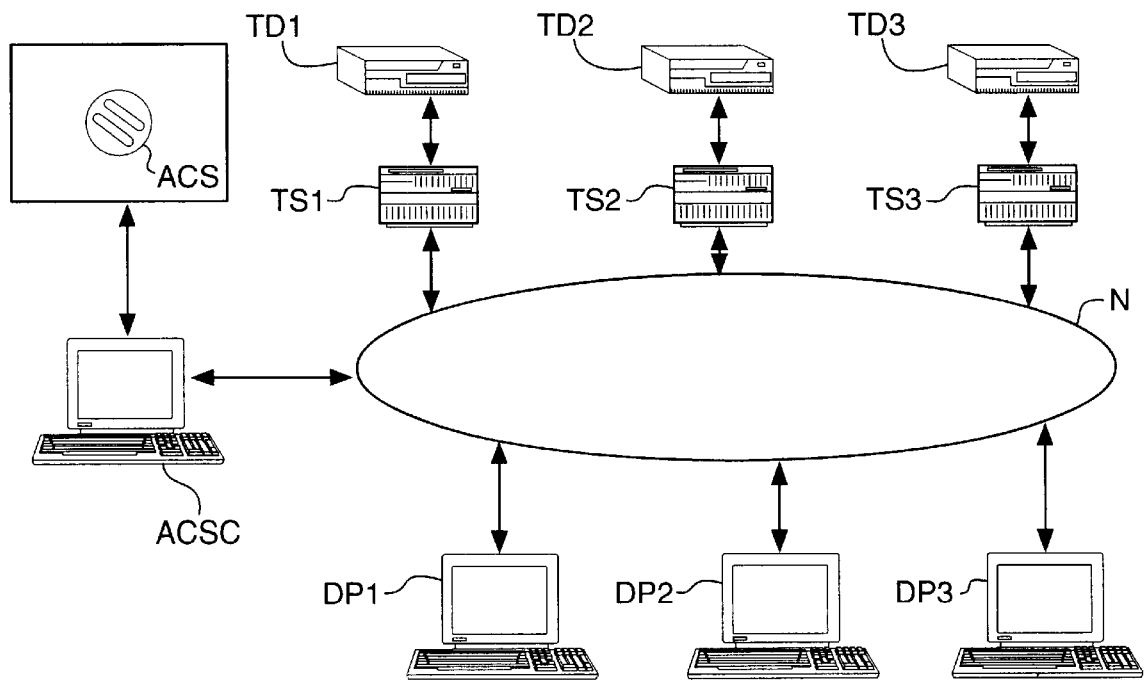
FIG. 2 illustrates in block diagram form the overall architecture of a traditional client/server network attached tape configuration.

FIG. 2 illustrates in block diagram form the overall architecture of a traditional client/server network attached tape configuration that is similar in operation to the system of FIG. 1. The differences are that the data processors DP1–DP3 (the clients) are no longer directly connected to the tape devices TD1–TD3, but share the plurality of tape devices TD1–TD3 among the data processors DP1–DP3. The communications among the data processors DP1–DP3, tape devices TD1–TD3 and automated tape cartridge library system controller ACSC are effected via a common network N which transmits both data and control information there between. Tape devices, such as those with SCSI interfaces, typically lack the ability to communicate directly with the network. To accommodate the network connection, tape devices TD1–TD3 are all located behind corresponding server processors TS1–TS3 connecting with them using a SCSI interface. This is a fixed, static configuration, difficult to scale to changing data storage needs.

Figure 3:
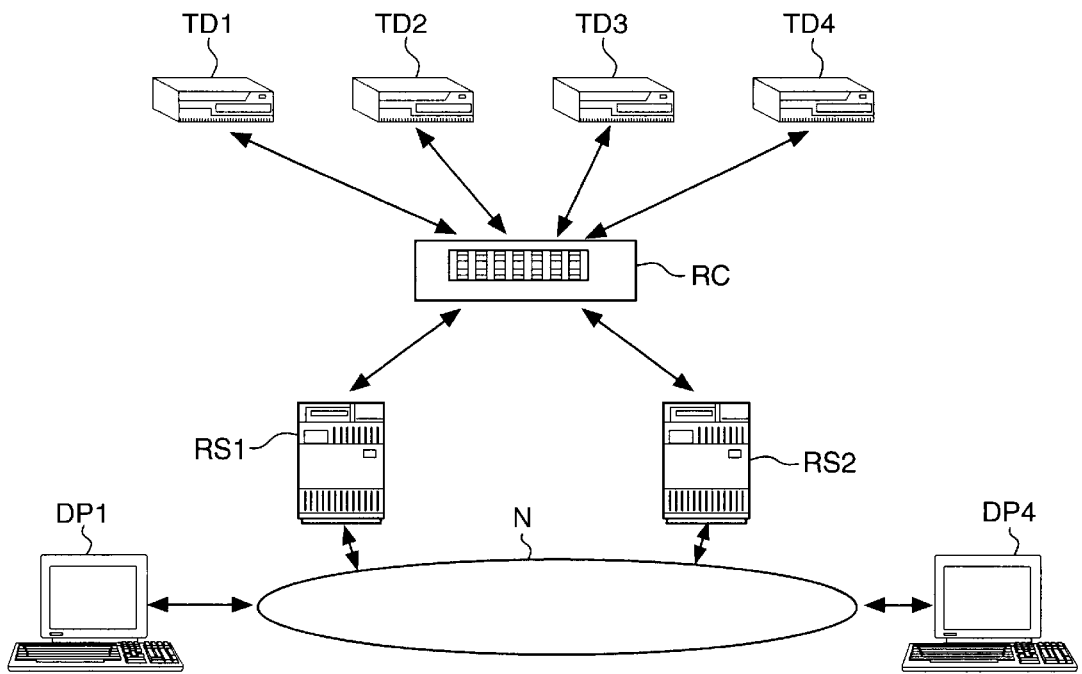
FIG. 3 illustrates in block diagram form the overall architecture of a traditional network attached RAIT configuration.

FIG. 3 illustrates in block diagram form the overall architecture of a traditional network attached RAIT array configuration where the individual tape devices of FIG. 2 are replaced by an array of tape devices TD1–TD4. The tape devices TD1–TD4 are configured in a redundant array of data storage devices in a manner analogous to the Redundant Array of Independent Disks (RAID) which is a well known architecture in the disk device technology. The operation of a RAID system, and by extension, the corresponding operation of the RAIT system is not described in detail herein, since such information is readily available in the literature. The RAIT system includes a RAIT controller RC that is connected to the network N via a plurality of servers RS1–RS2. The traditional RAIT is located behind a server, using a SCSI or Fibre Channel interface, and is a further example of a fixed, static configuration, difficult to scale to changing data storage needs.

System Architecture of Distributed Virtual Tape Storage Subsystem

Figure 4:
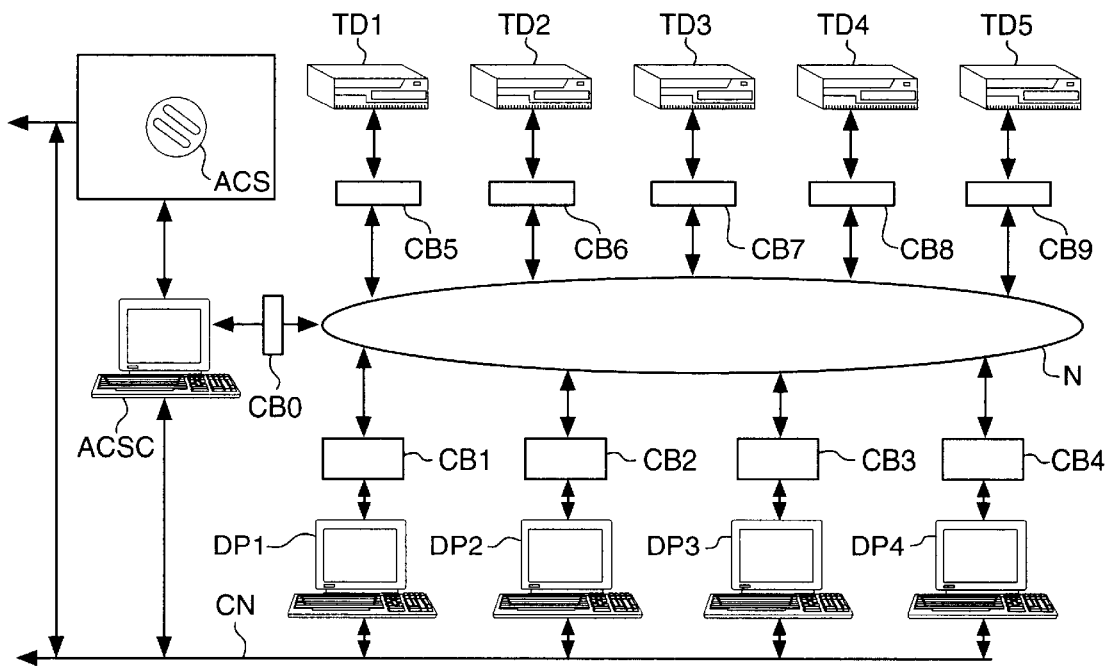
FIG. 4 illustrates in block diagram form the overall architecture of an embodiment of the network attached virtual tape storage subsystem of the present invention.

The architecture of the preferred embodiment as shown in FIG. 4 uses a shared pool of tape device resources TD1–TD5 to support multiple virtual storage devices, which are available to any and all of the data processors DP1–DP4. The number and performance levels of the virtual devices are only limited by the aggregate capacity and bandwidth of the tape device pool and the interconnecting network FN. This architecture also enables any tape array configuration (including, but not limited to RAIT 0, 1, 3, 4, 5) to be realized using the pooled tape devices TD1–TD5. The tape array(s) can be reconfigured dynamically since network FN interconnects the tape devices TD1–TD5 to the data processors DP1–DP4 under control of a network storage manager NSM whose functions are contained in the ACSC controller. The bandwidth of this networked distributed virtual tape device data storage subsystem is scalable and can be changed on demand. In addition, network security can be implemented.

Included in FIG. 4 are connection blocks CB1–CB9. These blocks are where the translation from the physical devices to the desired virtual device occurs. For example, if data processor DP1 requires a storage device of a data rate that the physical devices TD1–TD4 can not achieve individually, DP1 would request, over the network CN, that the NSM (located in the ACSC controller) construct a virtual device with the required data rate. The NSM would communicate with CB1 via the CB0 link to instruct it to stripe the data requested coming from DP1 across devices TD1+ TD2+ . . . +TD5 as needed to achieve the required data rate. DP1 communicates to its side of CB1 as though it were one storage device (the virtual device). Within CB1, the data from DP1 is striped and sent to the actual physical storage devices over the network FN. In this example the translation from physical to virtual device occurred within CB1; the connection blocks CB5–CB9 served only a pass-through function. The connection block CB0 links the ACSC interface to the FN network if needed. The connection block CB1–CB4 functions can be housed in separate physical boxes or located inside of DP1–DP4 (on a network interface-like card) or integrated into the network FN's hardware/software, such as within a networks switch fabric. In a similar manner, connection blocks CB5–CB9 could be housed in separate physical boxes or integrated into the storage device's TD1–TD5 hardware/software. Likewise, connection block CB0 could be housed in a separate physical box or integrated into the hardware/software of the ACSC. Connection blocks CB0–CB9 can include the functionality to bridge between dissimilar interfaces such as SCSI and fibre channel thereby permitting SCSI attached storage devices and data processors to be used on a fiber channel network. In an alternate implementation the translation from physical to virtual device can occur in connection blocks CB5–CB9 and in this case CB1–CB4 serve a pass through function. In this implementation the operation is similar to the previous case except that the data processor DP1 would communicate with an assigned connection block for example CB5 via CB1 via network FN. CB5 would now serve the same function as CB1 did in the previous case.

In operation, the data processors DP1–DP4 are supported by one or more virtual tape devices. The virtualization process is achieved by the functions in the Connection Blocks CB1–CB9. These functions are implemented in software and/or hardware. Each virtual tape device can be configured dynamically to have different characteristics at the request of the data processors DP1–DP4, as will be further described below. The data processors DP1–DP4 do not need to know how the virtual tape device is realized, since their interface to CB1–CB4 is consistent irrespective of the virtual tape device being realized.

Figure 5:
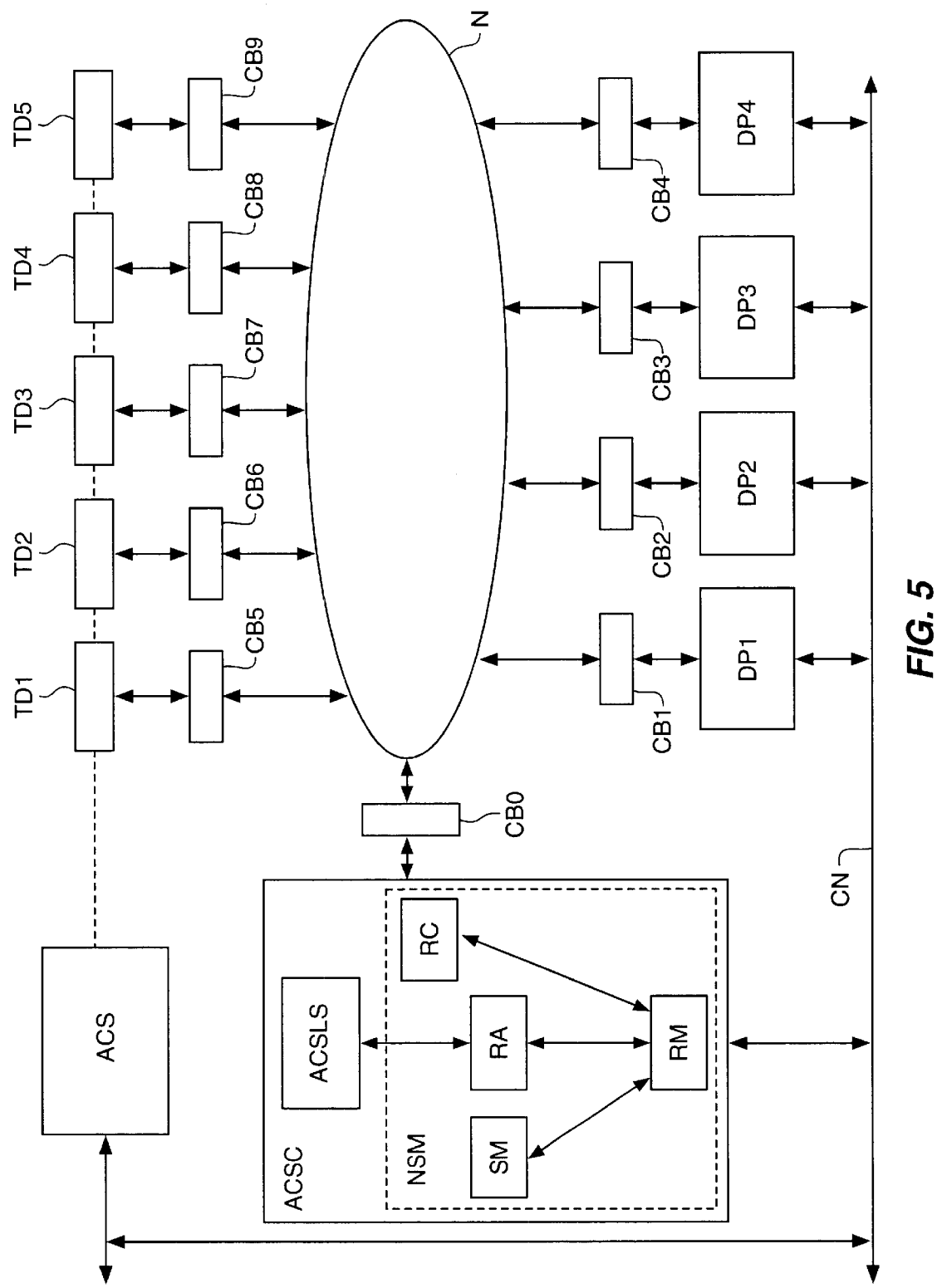
FIG. 5 includes a detail of the software architecture for the ACSC.

Referring to FIG. 5, when an application running under one of the data processors (e.g. DP1) needs a tape device, it makes a request to the RM software to mount a tape volume with the characteristics defined in the request. The request includes data transfer rate, data access time, data compression, and the like. The RM software will communicate with the ACSLS via the RA software to determine if the tape volume is already created or if the tape volume is new. If the tape volume is in the volume data base that ACSLS maintains, the RM software will retrieve the characteristics of this tape volume and determine how many physical tape devices are needed, and what configuration is required to accomplish the requested characteristics. If the tape volume is not in the volume database, the RM software will determine how many physical tape devices are needed based upon the request information. Then, the RM software makes a request to the RA software to reserve that required number of physical tape devices. The RA software communicates with the ACSLS to reserve that number of physical devices and to load the requested tape volume. The ACSLS communicates with one or more (if applicable) ACSs to load the desired tapes to the corresponding tape devices. The RM software instructs the RC software to configure all Connection Blocks. Continuing the example, the RC software instructs the Connection Blocks CB5, CB6, and CB7 that they are reserved to transfer data to and from Connection Block CB1. The RC software also instructs the Connection Block CB1 that the data that it receives from data processor DP1 will be striped to three different physical tape devices TD1, TD2, TD3 via the Connection Blocks CB5, CB6, and CB7. The RM software then informs the data processor DP1 that the virtual tape device is ready for data transfer. The data processor DP1 starts transferring data to the Connection Block CB1, which will buffer the data and transfer it to the physical tape devices TD1, TD2, TD3 via CB5, CB6, CB7. When the data processor DP1 is done with the data transfer and it wishes to release the virtual tape device, it makes a request to the RM. The RM software instructs the Connection Block CB1 to stop transferring data to/from the data processor DP1 and then communicates with the RA software to release the physical tape devices. The RA software instructs the ACSLS to unload the volume and to unload the tape cartridges from the tape devices. Finally, the RM software informs the data processor DP1 that the virtual device is released.

The use of the NSM enables the storage devices to be managed as a pool and yet be attached to the network FN as individual resources. The networked storage manager NSM provides the mechanism to control storage device allocation and configuration as well as other functions, such as cartridge movement and data migration. The rules can include response time constraints, data file transfer size, data file transfer rates, data file size bounds and the like. The networked storage manager NSM manages the allocation, configuration and security. Security can be implemented by establishing authentication between the data processors and the NSM to control file access or volume access. In addition, data encryption/de-encryption can be implemented within the control blocks CB1–CB4 and activated by a key held by the data processors DP1–DP4.

Fiber Channel Network

The SCSI interface is a commonly used bus topology. All devices that are connected to the SCSI bus share the fixed bus bandwidth, with only a single device being capable of accessing the bus at a time—SCSI bus bandwidth is not scalable. As more devices are attached to the SCSI bus, the contention for the bus increases and data transfer performance degrades. In contrast to the SCSI bus, in the fiber channel switched point to point fabric architecture, each branch is capable of the full fiber channel bandwidth; this is a bandwidth scalable system—adding branches increases the aggregate bandwidth of the fiber channel fabric. Although the SCSI interface is not designed for switched point-to-point operation, it can be converted to this use by the addition of a SCSI-to-fiber bridge. Referring to FIG. 4, in order to incorporate the SCSI interface and bus into this distributed virtual tape storage subsystem architecture, each SCSI attached device (DP1–DP4, TD1–TD5, ACSC) is equipped with a SCSI to fiber channel bridge function within connection blocks CB0–CB9.

The fiber channel network FN is controlled by the NSM software that is running in the automated cartridge library system controller ACSC. The ACSC controller is connected to the fiber channel network FN through CB0. The automated cartridge library system controller ACSC and all of the data processors DP1–DP4 are interconnected via an Ethernet control network CN. Since only control information is passed along this network, it does not limit data transfer performance of the overall system.

In an alternative embodiment of this invention, all control information from network CN is carried by network FN thus eliminating the need for the CN network. In another alternative embodiment, the ACS would attach to the network FN either directly (if fiber channel compatible) or through an appropriate bridge.

Referring to FIG. 5, in operation, a data processor (e.g. DP1) initiates a request to access a selected data volume that is managed by the ACSLS. DP1 then transmits this request, via control network CN, to the RM software that resides in the automated cartridge library system controller ACSC. The RM software receives the request and ascertains the physical location of the physical media that contains the selected data volume. The RM software also identifies an available tape device (e.g. TD4) via the RA software and the ACSLS software. The RM software instructs the ACSLS software via the RA software to transmit control signals to the automated tape cartridge library system ACS to initiate the mounting of the physical media, containing the selected data volume, onto tape device TD4. Once the tape mount is successful, the ACSLS software notifies the successful mount status to the RM software. The RM software then instructs the RC software to transmit a "RESERVED" command via CB0, with the network address form <HOST SCSI ID><HOST BRIDGE ID> to TD4's SCSI-to-fiber channel bridge function located in CB8 to reserve TD4 for the data processor DP1. The RC software also transmits a "TARGET BRIDGE ID" command to the SCSI-to-fiber channel bridge function located in CB1 that serves the requesting data processor DP1 to thereby identify TD4's SCSI-to-fiber channel bridge. Once the RM software reserves tape device TD4 for the requesting data processor DP1, it returns a status message to the data processor DP1 indicating a successful status. The requesting data processor DP1 can now transmit read/write and other SCSI commands to the identified tape device TD4 via the fiber channel network FN. When the requesting data processor DP1 completes the desired operations, it transmits a "DISMOUNT" command via the control network CN to the RM software. Upon receipt of the "DISMOUNT" command, the RM software instructs the ACSLS via the RA software to dismount the tape. The RM software also instructs the RC software to transmit a "RELEASE" command via CB0 to the CB8 SCSI-to-fiber channel bridge function. When the tape is unloaded, the RA software de-allocates the identified tape device TD4 in its resource table and returns a successful status to the RM software. The RM software then returns a successful status to the DP1. The identified tape device TD4 is then available to be used by any data processor.

Tape Array Features

Figure 6:
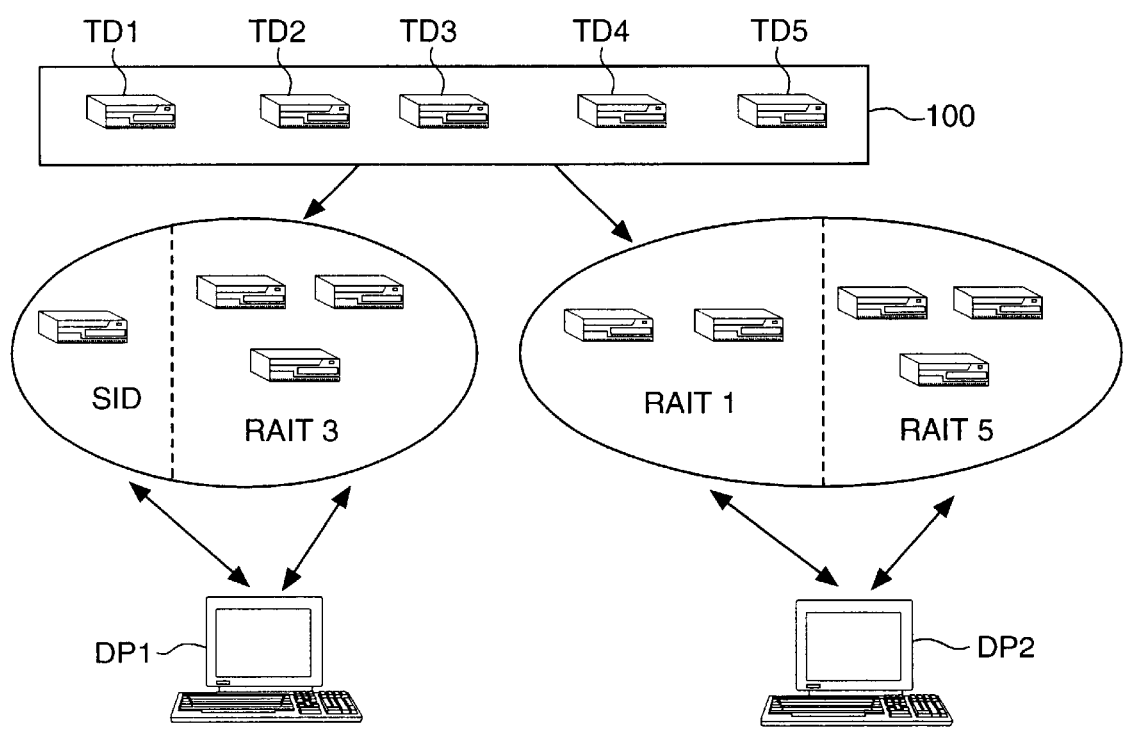
FIGS. 6, 7 and 8 illustrate in block diagram form the overall architecture of the dynamic mapping and data striping functions of the network attached virtual tape storage subsystem of the present invention.
Figure 7:
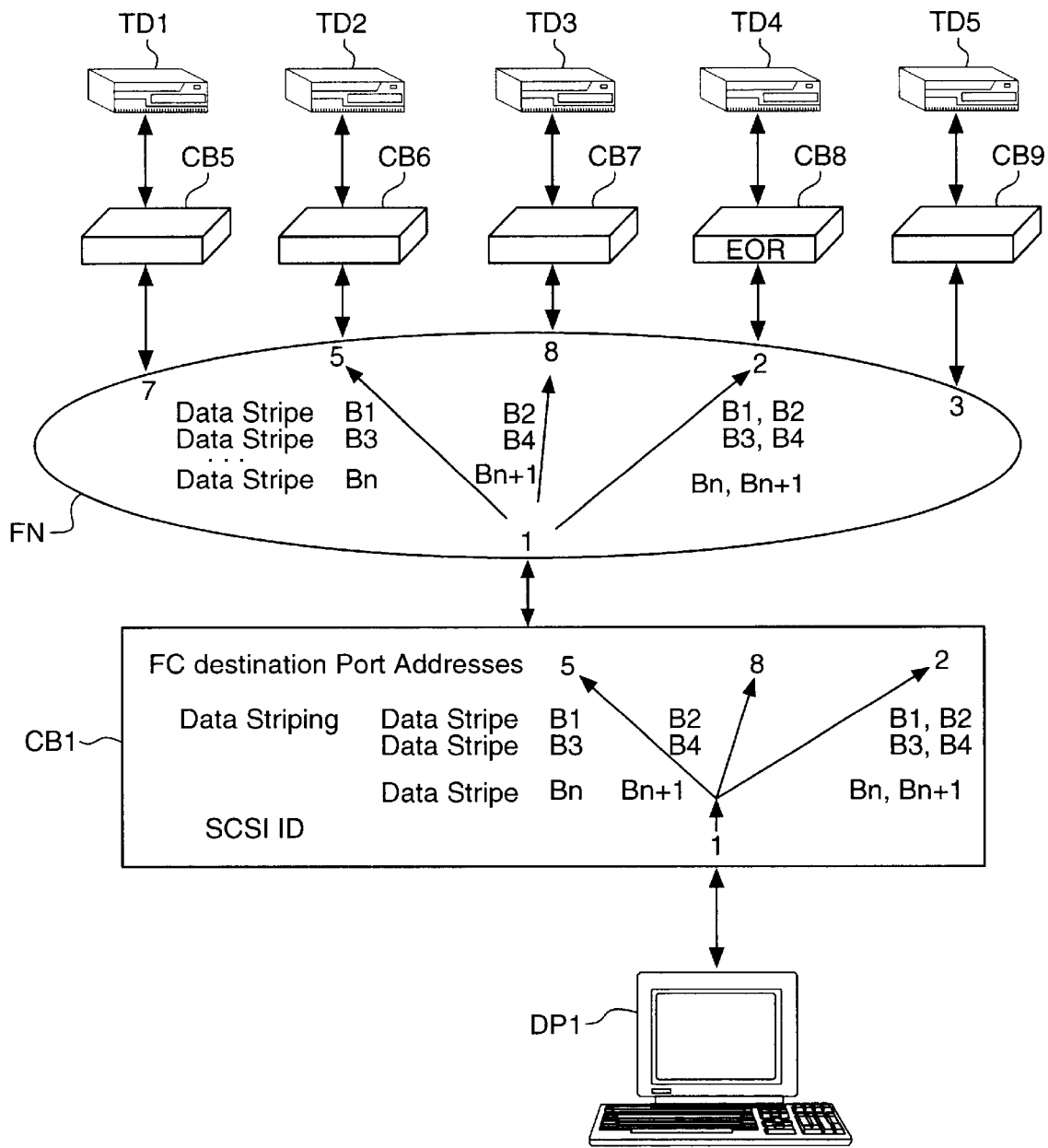
Figure 8:
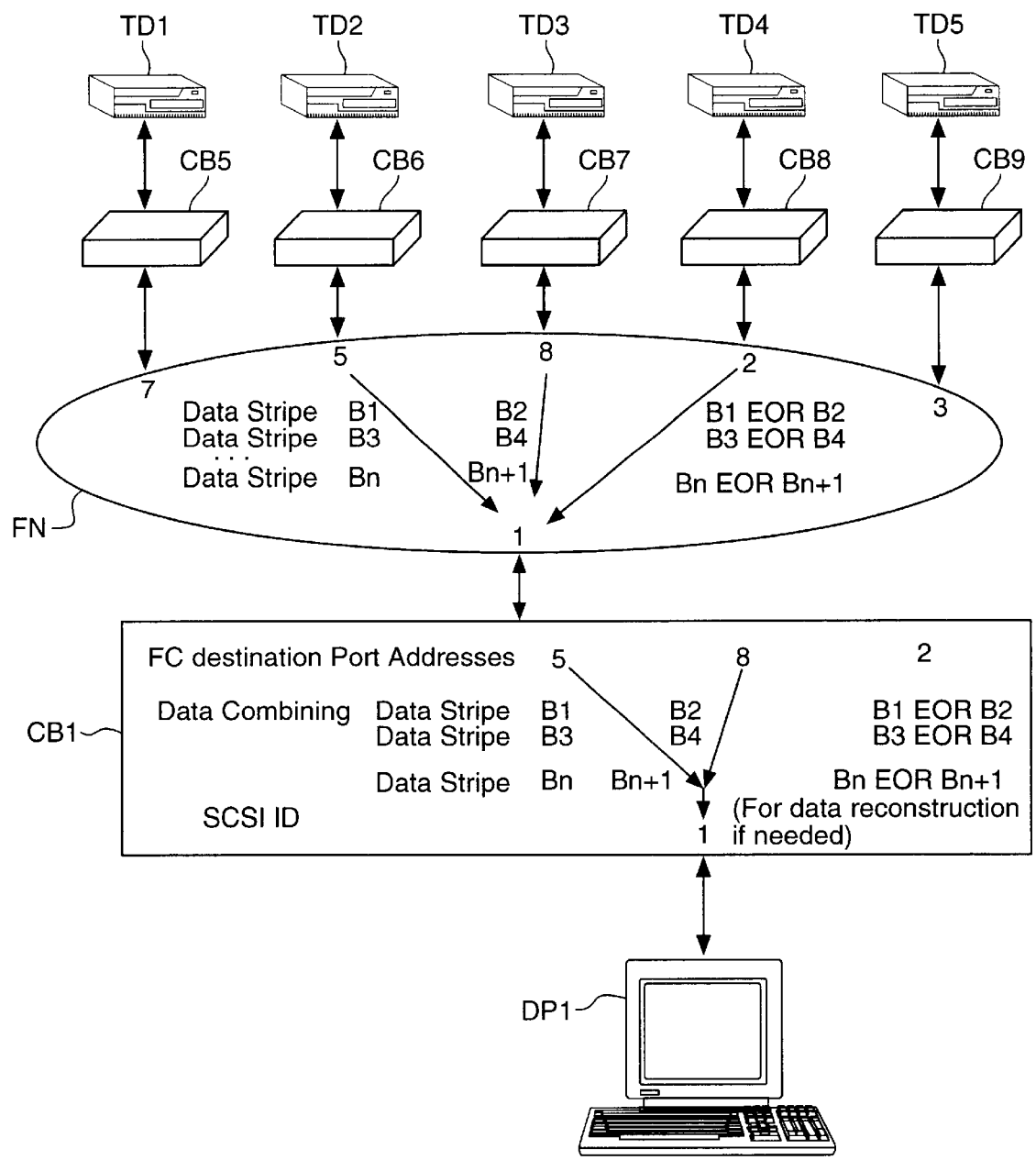

FIGS. 6 and 7 and 8 illustrate in block diagram form the overall architecture of the dynamic mapping and data striping functions, respectively, of the network attached virtual tape storage subsystem. In particular, FIG. 6 illustrates the concept of supporting the storage requirements of the data processors DP1, DP2 with a plurality of virtual storage devices. In this example, the virtual storage devices include those made up of a "single independent drive" SID, a RAIT 3 group with three tape devices, a RAIT 1 group with two tape devices, and a RAIT 5 group with three tape devices. A plurality of tape devices TD1–TD5 are in a pool 100 that provides resources for the above virtual device configurations. The creation of virtual devices is limited to the tape device resources of the pool; not all of the virtual devices of FIG. 6 can simultaneously exist. The configuration of the tape devices TD1–TD5 is controlled by the networked storage manager NSM on a dynamic basis responding to the storage needs of the data processors DP1, DP2. These storage needs may be communicated to the NSM by manual operator commands, preprogrammed algorithms, rules, application program initiated requests and the like.

Tape Array Configuration

When a storage device request, issued by a data processor within the system, can be met by the capabilities of a single tape device in the storage device pool, that device (if available) will be temporarily assigned to the requesting data processor. However, if the data processor's storage request exceeds the performance capabilities of a single device in the storage device pool, the system will attempt to allocate multiple storage devices and configure them as a RAIT group. The specific configuration will be dependent upon the storage performance requested.

FIG. 7 illustrates the concept of striping the data across a plurality of the tape devices TD1–TD5. In this example, a host data processor DP1 connects to the connection block CB1 via the SCSI ID 1 interface. Host DP1 makes a request to the NSM (not shown in FIG. 7) that it desires to transfer data at some speed "X Mbytes/sec" and that it desires the data to be stored with parity. The NSM translates the desired bandwidth that the host DP1 requested into the number of tape devices that support the requested bandwidth. In this example, the number of drives is three: two drives for data and one drive for parity. The NSM allocates drives TD2, TD3 and TD4 for host DP1. The NSM configures the connection block CB1 to stripe the data that comes from SCSI ID 1 for the write operation and to merge the striped data for the read operation. The NSM also instructs the CB1 to send the striped data to the appropriate destination fibre channel port 5, 8 and 2. For the write operation, the data received at SCSI ID 1 is striped into blocks B1, B2, . . . Bn, Bn+1. The connection block CB1 sends block B1, B3, . . . , Bn to TD2 and TD4 via CB6, CB8 using the multicast capability of the network FN. It then sends the block B2, B4, . . . , Bn+1 to TD3 and TD4 via CB7, CB8 using the same method. Blocks B1 and B2, B3 and B4, . . . Bn and Bn+1 received at the connection block CB8 are exclusive OR'ed together to generate the parity data which is sent to TD4. Referring to FIG. 8, for the read operation, data blocks B1, B3, . . . , Bn, B2, B4, . . . , Bn+1 and the parity blocks are delivered to the connection block CB1. Data blocks B1 and B2, B3 and B4, . . . , Bn and Bn+1 are merged together in the connection block CB1 and the resulting data stream is transferred to the SCSI ID 1 for delivery to DP1. If one of the data blocks is bad, the connection block CB1 will perform data recovery by performing an exclusive OR operation on the corresponding parity block and the good data block to recover the bad data block. The recovered data block and the good data block are merged together and the resulting data stream is transferred to the SCSI ID 1.

Although the preferred system embodiment presented here utilizes tape devices for storage, the same system architecture could be applied to other removable storage device types e.g. optical disk, magnetic disk, optical tape, memory cards, and the like. Furthermore, those skilled in the art would be able to utilize this invention for fixed media storage devices as well e.g. magnetic disk. With fixed media storage devices, the system can be simplified by the omission of robotic libraries and the software used to allocate, configure and manage the plurality of media associated with each storage device.

What is claimed:

1. A system, comprising:

a network;

a plurality of data processors coupled to the network;

a plurality of storage devices coupled to the network; and means, coupled to the network, for dynamically creating at least one virtual device from at least two of the plurality of storage devices, wherein the means for creating at least one virtual device is responsive to a storage request from at least one of the plurality of data processors to establish at least one data storage characteristic of (i) capacity, (ii) data rate, (iii) fault tolerance and (iv) security as specified by the storage request.

2. A system, comprising:

a network;

a plurality of data processors coupled to the network;

a plurality of physical storage devices coupled to the network, wherein the plurality of physical storage devices comprises a plurality of tape drives and a plurality of tape media, wherein the plurality of tape media are manipulated by at least one automated tape cartridge library system; and means, coupled to the network, for dynamically creating at least one virtual device from at least two of the plurality of physical storage devices in response to a storage request, wherein the at least one automated tape cartridge library system is operatively coupled to the means for dynamically creating at least one virtual device.

3. A system, comprising:

a network;

a plurality of data processors coupled to the network;

a plurality of storage devices coupled to the network; and means, coupled to the network and responsive to a storage request, for dynamically creating at least one virtual device from at least two of the plurality of storage devices; and a control network coupled to the plurality of data processors and the means for dynamically creating at least one virtual device, wherein the network is a high speed data network and the control network operates at a low speed with respect to the high speed data network.

4. The system of claim 3, wherein the control network is an ethernet based network.

5. The system of claim 3, wherein the high speed data network is a fiber channel network.

6. A system for storing data, comprising:

a network;

a plurality of data processors coupled to the network;

a plurality of storage devices coupled to the network; and means, coupled to the network, for dynamically creating at least one virtual device from at least a portion of the plurality of storage devices, wherein the means for dynamically creating at least one virtual device comprises:

a network storage manager means for receiving a storage request from at least one of the plurality of data processors; and a plurality of control block means, each operatively coupled between a respective one of the plurality of data processors and the network, for redirecting said data received from its respective data processor to one or more of the plurality of storage devices as previously configured by the network storage means.

7. The system of claim 6, wherein the control block means are integral with their respective data processor.

8. The system of claim 6, wherein the control block means are integral with a network interface card connected to their respective data processor.

9. The system of claim 6, wherein the control block means are integral with the network.

10. A system for storing data, comprising:

a network;

a plurality of data processors coupled to the network;

a plurality of storage devices coupled to the network; and means, coupled to the network, for dynamically creating at least one virtual device from at least a portion of the plurality of storage devices, wherein the means for dynamically creating at least one virtual device comprises:

a network storage manager means for receiving a storage request from at least one of the plurality of data processors; and a plurality of control block means, each operatively coupled between a respective one of the plurality of storage devices and the network, for redirecting said data received from the network to one or more of the plurality of storage devices as previously configured by the network storage means.

11. The system of claim 10, wherein the control block means are integral with their respective storage device.

12. The system of claim 10, wherein the control block means are integral with a network interface card connected to their respective storage device.

13. The system of claim 10, wherein the control block means are integral with the network.

14. A system for storing data, comprising:

a network;

a plurality of data processors coupled to the network;

a plurality of storage devices coupled to the network; and means, coupled to the network, for dynamically creating at least one virtual device from at least a portion of the plurality of storage devices, wherein the means for dynamically creating at least one virtual device comprises:
- a network storage manager means for receiving a storage request from at least one of the plurality of data processors; and
- a control block means, integral with the network, for redirecting said data received by the network to one or more of the plurality of storage devices as previously configured by the network storage means.

15. The system of claim 14, wherein the control block means is integral with the network.

16. The system of claim 14, wherein the network comprises a network fabric switch, and the control block means is integral with the network fabric switch.

17. A system, comprising:

a network;

a plurality of storage devices coupled to the network; and means for managing the plurality of storage devices as a pooled resource, wherein the means for managing comprises:
- network system management means for managing the plurality of storage devices; and
- a plurality of control block means for translating data received from at least one of a plurality of data processors to appropriate of the plurality of storage devices as previously configured by the network system management means.

18. A system, comprising:

a network;

a plurality of data processors coupled to the network;

a plurality of storage devices coupled to the network; and means, coupled to the network, for dynamically managing at least one virtual device composed from at least two of the plurality of storage devices, wherein the means for dynamically managing comprises means for dynamically changing any of configuration and performance of the at least one virtual device as specified by a storage request.

19. In a system comprising a network, a plurality of data processors coupled to the network and a plurality of storage devices coupled to the network, a method comprising the steps of:

receiving a storage request;

in response thereto, dynamically creating a virtual device from at least a portion of the plurality of storage devices by configuring a plurality of control blocks coupled to the network to redirect data received by said plurality of control blocks to one or more of the plurality of storage devices; and redirecting data from at least one of the plurality of data processors to one or more of the plurality of storage devices by the configured control blocks.

20. In a system comprising a network and a plurality of physical storage devices connected to the network, a method of managing the plurality of physical storage devices as a pooled resource, comprising the steps of:

configuring at least two of the plurality of physical storage devices as a virtual device having a first storage characteristic;

receiving a storage request from a processor:

dynamically reconfiguring at least two of the configured physical storage devices as another virtual device having a second storage characteristic different from the first storage characteristic, wherein the step of dynamically reconfiguring is responsive to the storage request; and translating data received from the processor to appropriate of the plurality of storage devices.

* * * * *